United States Patent
Mei et al.

(10) Patent No.: US 7,706,106 B1
(45) Date of Patent: Apr. 27, 2010

(54) HARD DISK DRIVE SUSPENSION LIFTER WITH REINFORCING FEATURES FOR HIGH SHOCK RESISTANCE

(75) Inventors: Shijin Mei, Murrieta, CA (US); Peter Hahn, Wildomar, CA (US); Arshad Alfoqaha, Eden Prairie, MN (US)

(73) Assignee: Magnecomp Corporation, Murrieta, CA (US)

( * ) Notice: Subject to any disclaimer, the term of this patent is extended or adjusted under 35 U.S.C. 154(b) by 887 days.

(21) Appl. No.: 11/288,946

(22) Filed: Nov. 28, 2005

(51) Int. Cl.
*G11B 5/54* (2006.01)

(52) U.S. Cl. ............... 360/255; 360/254.6; 360/255.5; 360/255.9

(58) Field of Classification Search .............. 360/254.6, 360/255, 255.5, 255.9
See application file for complete search history.

(56) References Cited

U.S. PATENT DOCUMENTS

| | | | |
|---|---|---|---|
| 5,526,205 A | 6/1996 | Aoyagi et al. |
| 5,771,136 A | 6/1998 | Girard |
| 5,815,349 A | 9/1998 | Frater |
| 5,838,517 A | 11/1998 | Frater et al. |
| 5,930,079 A | 7/1999 | Vera et al. |
| 5,930,080 A | 7/1999 | Frater et al. |
| 5,959,807 A | 9/1999 | Jurgenson |
| 5,987,733 A | 11/1999 | Goss |
| 6,021,022 A | 2/2000 | Himes et al. |
| 6,046,883 A | 4/2000 | Miller |
| 6,067,209 A | 5/2000 | Aoyagi et al. |
| 6,069,773 A | 5/2000 | Frater et al. |
| 6,137,657 A | 10/2000 | Coon et al. |
| 6,147,839 A | 11/2000 | Girard |
| 6,172,853 B1 | 1/2001 | Davis et al. |
| 6,181,525 B1 | 1/2001 | Carlson |
| 6,191,915 B1 | 2/2001 | Takagi et al. |
| 6,195,237 B1 | 2/2001 | Perez |
| 6,233,121 B1 | 5/2001 | Pan |
| 6,243,235 B1 | 6/2001 | Fu et al. |
| 6,266,212 B1 | 7/2001 | Coon |
| 6,320,729 B1 | 11/2001 | Coon |

(Continued)

*Primary Examiner*—A. J. Heinz
(74) *Attorney, Agent, or Firm*—Intellectual Property Law Offices of Joel Voelzke, APC

(57) ABSTRACT

Shock performance and stiffness of hard disk drive lifters are enhanced by extending one or more portions of a load beam in a dimension normal to the load beam plane. A load beam in a high shock suspension system comprises a planar body having transverse members extending between longitudinal rails. One embodiment comprises a lifter integral to the load beam, extending distally, and comprising a rib having a conic cross section and a lifting tab having upward curving edges. Another embodiment comprises rails having edges bending upward at 90 degrees, separated by a first width at a proximal end of the body, and tapering to a second width at a distal end of the body. A narrow lifter having upward curving edges is displaced between the rails, and extends distally from the body. Stiffeners extend from the rails and connect to an intermediate point on the lifter. Another embodiment comprises the body having a transition portion tapering in a distal direction to form a narrow lifter, and a 90-degree rail bordering the body, transition portion, and lifter. Other embodiments comprise: the body slanting upward at an slight angle and a lifter extending distally from the body; a lifter slanting upward then downward to a position parallel with a load beam plane; transverse members having curved edges; and protrusions located on a border between the body and an intermediate portion that tapers to a lifter.

16 Claims, 14 Drawing Sheets

U.S. PATENT DOCUMENTS

| | | |
|---|---|---|
| 6,327,118 B1 | 12/2001 | Perez |
| 6,367,145 B1 | 4/2002 | Coon et al. |
| 6,373,664 B1 | 4/2002 | Coon et al. |
| 6,388,843 B1 | 5/2002 | Takagi et al. |
| 6,417,986 B1 | 7/2002 | Tran et al. |
| 6,417,996 B1 | 7/2002 | Budde |
| 6,424,498 B1 | 7/2002 | Patterson et al. |
| 6,426,851 B1 | 7/2002 | Perez |
| 6,445,546 B1 | 9/2002 | Coon |
| 6,483,670 B1 | 11/2002 | Watanabe et al. |
| 6,504,684 B1 | 1/2003 | Danielson et al. |
| 6,533,950 B1 | 3/2003 | Shum et al. |
| 6,549,372 B1 | 4/2003 | Chen et al. |
| 6,549,375 B1 | 4/2003 | Crane et al. |
| 6,560,074 B2 | 5/2003 | Gillis et al. |
| 6,587,309 B2 | 7/2003 | Nojima |
| 6,667,856 B2 | 12/2003 | Danielson et al. |
| 6,714,386 B1 | 3/2004 | Polycarpou et al. |
| 6,791,798 B1 | 9/2004 | Mei |
| 7,365,945 B2 | 4/2008 | Fujimoto et al. |
| 7,450,347 B2 * | 11/2008 | Suzuki et al. ............... 360/255 |
| 2003/0086207 A1 | 5/2003 | Watadani et al. |

* cited by examiner

BOTTOM VIEW

SIDE VIEW

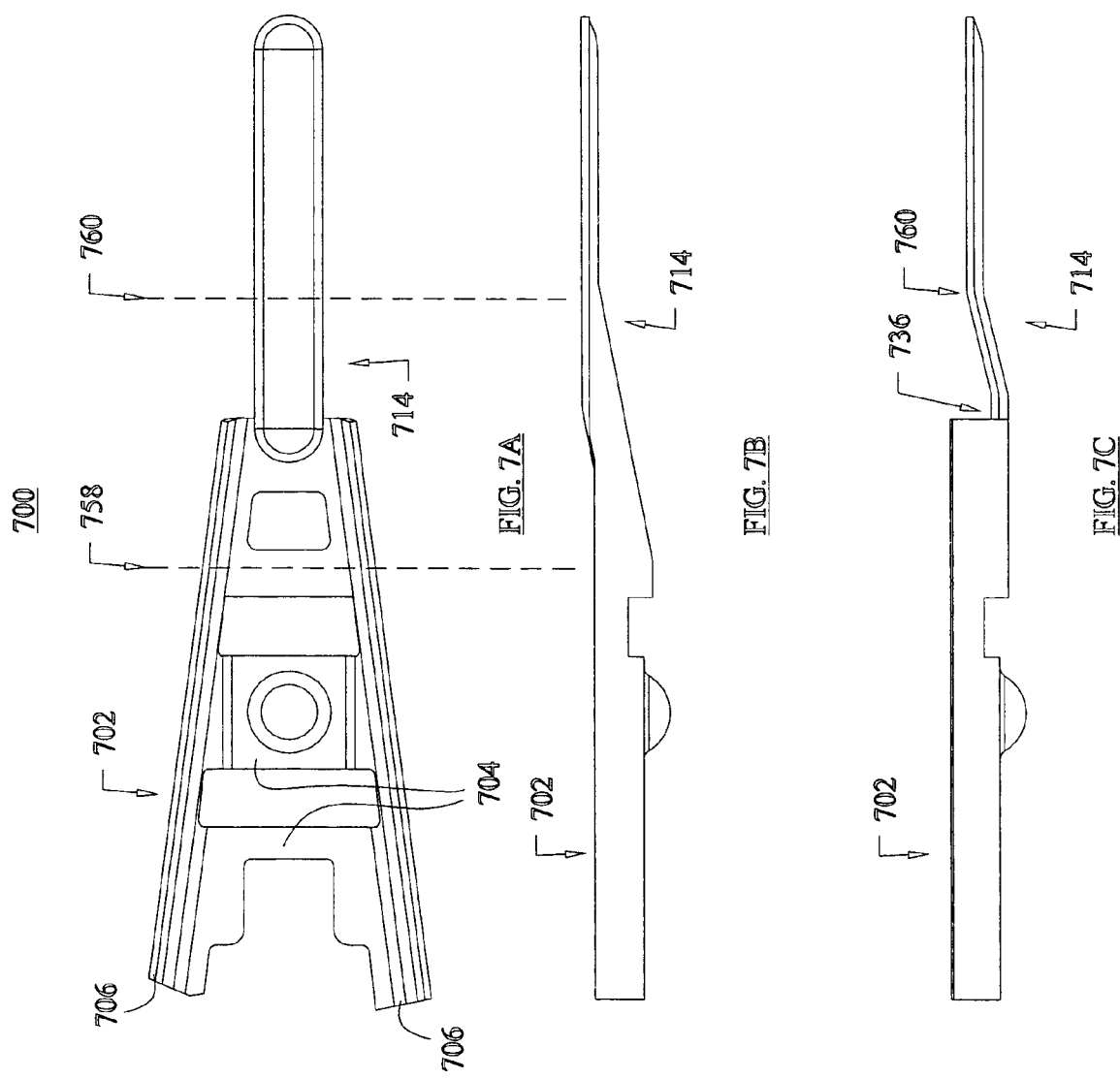

HARD DISK DRIVE SUSPENSION LIFTER WITH REINFORCING FEATURES FOR HIGH SHOCK RESISTANCE

BACKGROUND

1. Field of the Invention

The present invention relates generally to suspension systems for hard disk drive systems. More specifically, the invention relates to lifters used in hard disk drive suspension assemblies. Most specifically, the invention relates to lifters designed to cope with high shock conditions.

2. Related Art

Disk drive head suspensions, or head gimbal assemblies, are well known in the art. These assemblies typically comprise a load beam and a flexure, the load beam extending longitudinally from a base plate, and the flexure moveably coupled to the load beam. A dimple displaced between the flexure and load beam provides a pivot point for the flexure. A read/write head, typically mounted at or near the distal end of the flexure, reads data from and writes data onto a disk surface during high-speed rotation of the disk within influential range of the head. Movement of the disk past the head creates aerodynamic flow exploited by the head to create an air bearing which maintains a minute separation form the head to the disk. The load beam is pre-loaded such that, during steady-state conditions, the pre-load force counteracts the lift force to advantageously suspend the read/write head at an optimal distance from the disk surface. In an unloaded condition, the load beam maintains a minimum lift clearance from the disk surface. Normally, the lift clearance between load beam and disk surface is in the range of 0.35 mm to 0.75 mm.

During a shock event, vertical movement of the suspension assembly may occur, causing the read/write head to impact the disk surface. This action may cause damage to the read/write head, load beam, or flexure, and permanently alter the lift clearance. In severe cases, the impact may damage the disk surface, causing loss of stored data. Shock conditions may result from normal operation, for example, during loading or unloading of a disk. Other sources of shock include non-operational phenomena such as shipping, handling, or installation that cause external jarring or impact to the system. Disk drive systems used in mobile applications are especially subject to shock.

A desired shock rating for disk drive systems typically ranges between 500 g/gm and 1000 g/gm. To meet this criteria, lifters are designed for high stiffness and low mass in order to optimize shock performance. Generally, a high stiffness dampens suspension system response to shock, and provides a lifter with sufficient material strength to resist deformation and withstand shear forces. In addition, a low mass minimizes the reactive forces transmitted by the lifter to interconnected suspension assembly components. However, a tradeoff occurs when attempting to achieve these design objectives. Greater stiffness is achieved at the expense of higher mass, and reducing mass tends to lower stiffness. A lifter stiffness of at least 800 N/m may be required for certain applications. Meeting this criteria while maintaining the shock rating is especially challenging for designers.

The effectiveness of a forming technique used to form shock-resistant limiters varies according to the thickness of the base material. Previous techniques used on thick material cannot be applied effectively to thinner materials that are required for low mass/high shock applications. One such technique, typically employed on thicker materials, is known as M-forming. M-forming consists of configuring a lifter with an M-shaped cross section 101, as shown in FIG. 1. M-forming is attractive from a manufacturing standpoint because the forms are cylindrical in character, and relatively easier to fabricate than conical shapes in hard material. However, one drawback of applying M-forming on thin material is difficulty in achieving high stiffness—an M-formed stiffness on the order of 500 N/m is typical. Another drawback of M-forming is that it limits the amount of offset that can be achieved between the bottom of the lifter and lowest point on the load beam. In order to form a higher offset, a wider load beam may be used, but that adds more mass to the lifter thereby reducing shock performance. Another technique used for thick base materials is known as jog-forming, which consists of adding an upward-sloping ramp, or jog 201, between the load beam and lifter, as shown in FIG. 2. Although jog-forming allows for a higher offset, stiffness and shock performance tend to be lower than an M-formed lifter. Thus, both of these techniques produce lifters having a stiffness/mass tradeoff that is too limiting to meet the most demanding shock performance ratings.

In view of the foregoing, there is an ongoing need to improve the shock performance of limiters in disk drive suspension systems.

SUMMARY

Various embodiments of the present invention provide improvements in the design and function of lifters subjected to high-shock conditions in HDD systems. These improvements generally comprise extending one or more portions of a planar load beam into a vertical dimension above or below the load beam plane.

In accordance with a first embodiment of the invention, a load beam comprises a body portion having one or more substantially planar transverse members extending between rails that border the body portion along longitudinal edges. A dimple protrudes downward from one of the transverse members to provide a pivot point for a flexure. A lifter comprising a rib having a conic cross section and a tab having a generally triangular shape is located at a distal end of the load beam. The tab comprises a base and one or more upward curving edges that intersect at or near the point of the triangle. The rib has a width narrower than the base, and extends longitudinally between the dimple and tab, connecting the base to one of the transverse members. This embodiment achieves a lifter stiffness of about 1005 N/m, and, by virtue of the rib and tab configuration, allows for a reduction in overall mass.

In a second embodiment of the invention, a load beam comprises a substantially planar body portion having one or more transverse members extending between opposing rails. The rails comprise edges bending at about a 90 degree angle from the one or more transverse members. The rails are separated by a first width at a proximal end of the body portion, and taper to a second width at a distal end of the body portion. A lifter is displaced between the rails, and has a width narrower than the second width. The lifter has one or more upward curving edges and extends in a longitudinal direction from the distal end of the body portion. At least one stiffener extends from one of the rails and connects to the lifter at an intermediate location on the lifter. By adding the one or more stiffeners, this embodiment generally increases lifter stiffness by about 50%, resulting in a stiffness on the order of 800 N/m for a lifter formed from stainless steel having a uniform thickness in a range of about 20 μm to 30 μm.

In another aspect of the second embodiment, the lifter further comprises first and second sections. The first section is displaced between the rails and extends in the longitudinal direction from the distal end of the body portion to a higher elevation. The second section extends in the longitudinal direction from a distal end of the first section along the higher elevation, and at least one stiffener connects to the second section.

In another embodiment, a load beam according to the invention comprises a substantially planar body having one or more transverse members extending between opposing longitudinal edges. The edges are separated at a distal end of the body by a first width. A transition portion extends from the distal end in a longitudinal direction and tapers to form a narrower, second width. A lifter extends from the second width in the longitudinal direction. The lifter has a width substantially equal to the second width. A rail comprising a continuous edge borders the body, the transition portion, and the lifter. The rail bends at an angle of about 90 degrees from the body plane and maintains a substantially uniform height with respect to the body plane. This embodiment can achieve a stiffness as high as 1000 N/m for a load beam thickness of 20 μm.

Other embodiments include a planar load beam having a body portion slanting upward at an angle between about 5 degrees and about 15 degrees with respect to the load beam plane. A lifter extending distally from the body portion slants downward beginning at an intermediate location on the lifter, at an angle between about 5 and about 15 degrees with respect to the upward slant. In still other embodiments, a lifter extending from a planar load beam slants first upward, then downward to a position substantially parallel with the load beam plane. The slanting technique allows formation of a narrower load beam, thereby reducing mass, and can achieve a shock rating up to 725 g/gm and a lifter stiffness on the order of 1000 N/m.

And in various implementations of the aforementioned embodiments, load beams according to the invention may include one or more transverse members having curved edges bordering a hollow area in a load beam plane, and may also include one or more protrusions located on a border between a body portion and an intermediate portion that transitions to a lifter. These features, singly or in combination, can increase lifter stiffness from about 6% to about 15%.

Related systems, methods, features and advantages of the invention or combinations of the foregoing will be or will become apparent to one with skill in the art upon examination of the following figures and detailed description. It is intended that all such additional systems, methods, features, advantages and combinations be included within this description, be within the scope of the invention, and be protected by the accompanying claims.

BRIEF DESCRIPTION OF THE DRAWINGS

Preferred embodiments of the invention will hereinafter be described in conjunction with the appended drawings provided to illustrate and not to limit the invention. The components in the figures are not necessarily to scale, emphasis instead being placed upon illustrating the principles of the invention. In the figures, like reference numerals designate corresponding parts throughout the different views.

FIG. 5b shows a side view of the load beam of FIG. 5a.

FIG. 6b shows a top view of the load beam of FIG. 6a.

FIG. 7a shows a top view of another embodiment according to the invention comprising a high shock load beam having upward slanting and downward slanting portions.

FIG. 7b shows a side view of the load beam of FIG. 7a.

FIG. 7c shows a side view of another embodiment according to the invention comprising a high shock load beam having an upward and downward slanting limiter.

DETAILED DESCRIPTION

As utilized herein, terms such as "about" and "substantially" and "approximately" are intended to allow some leeway in mathematical exactness to account for tolerances that are acceptable in the trade. Accordingly, any deviations upward or downward from the value modified by the terms "about" or "substantially" or "approximately" in the range of 1% to 20% should be considered to be explicitly within the scope of the stated value.

Figure 1:
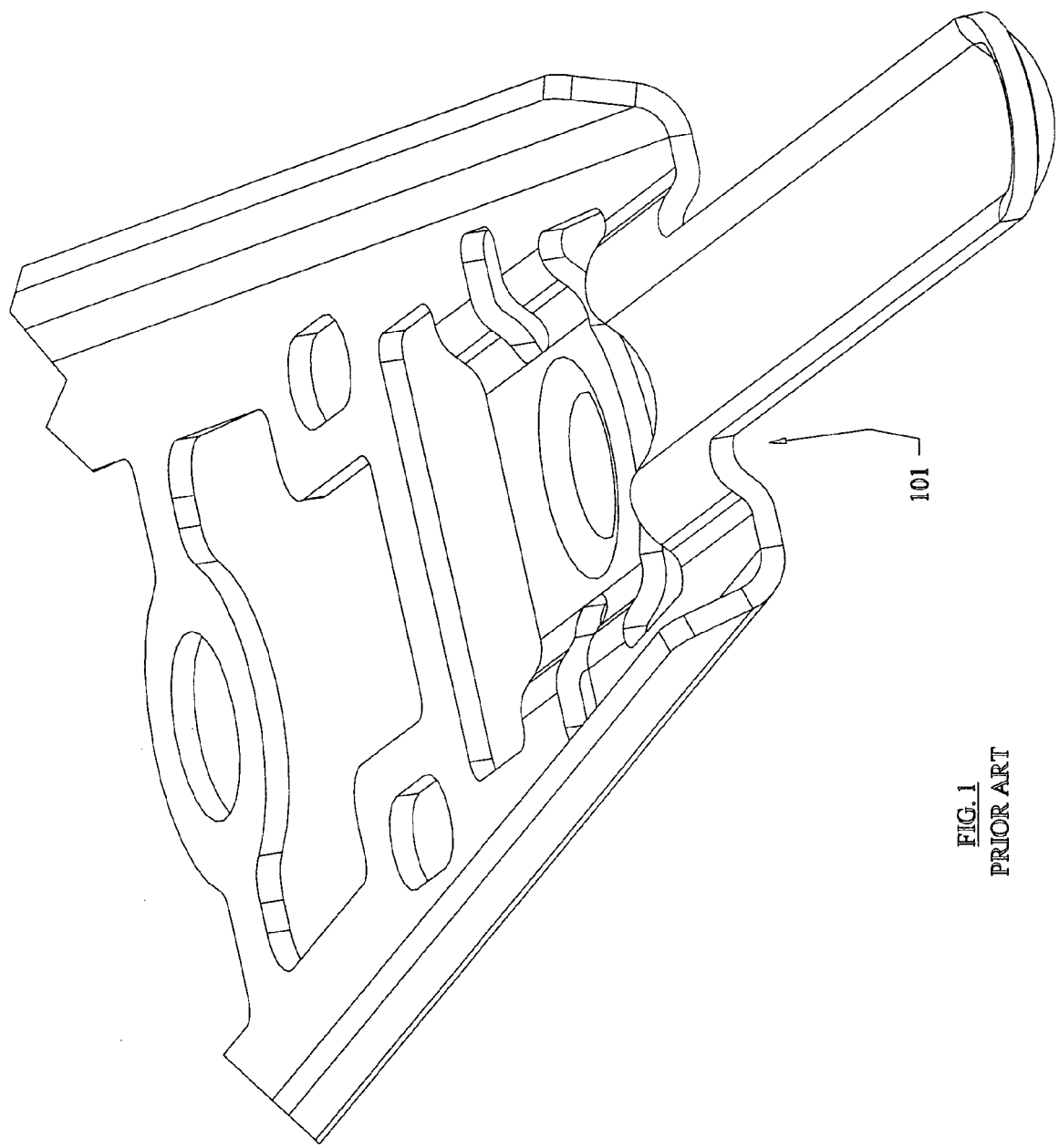
FIG. 1 shows an example of M-forming in a conventional lifter.
Figure 2:
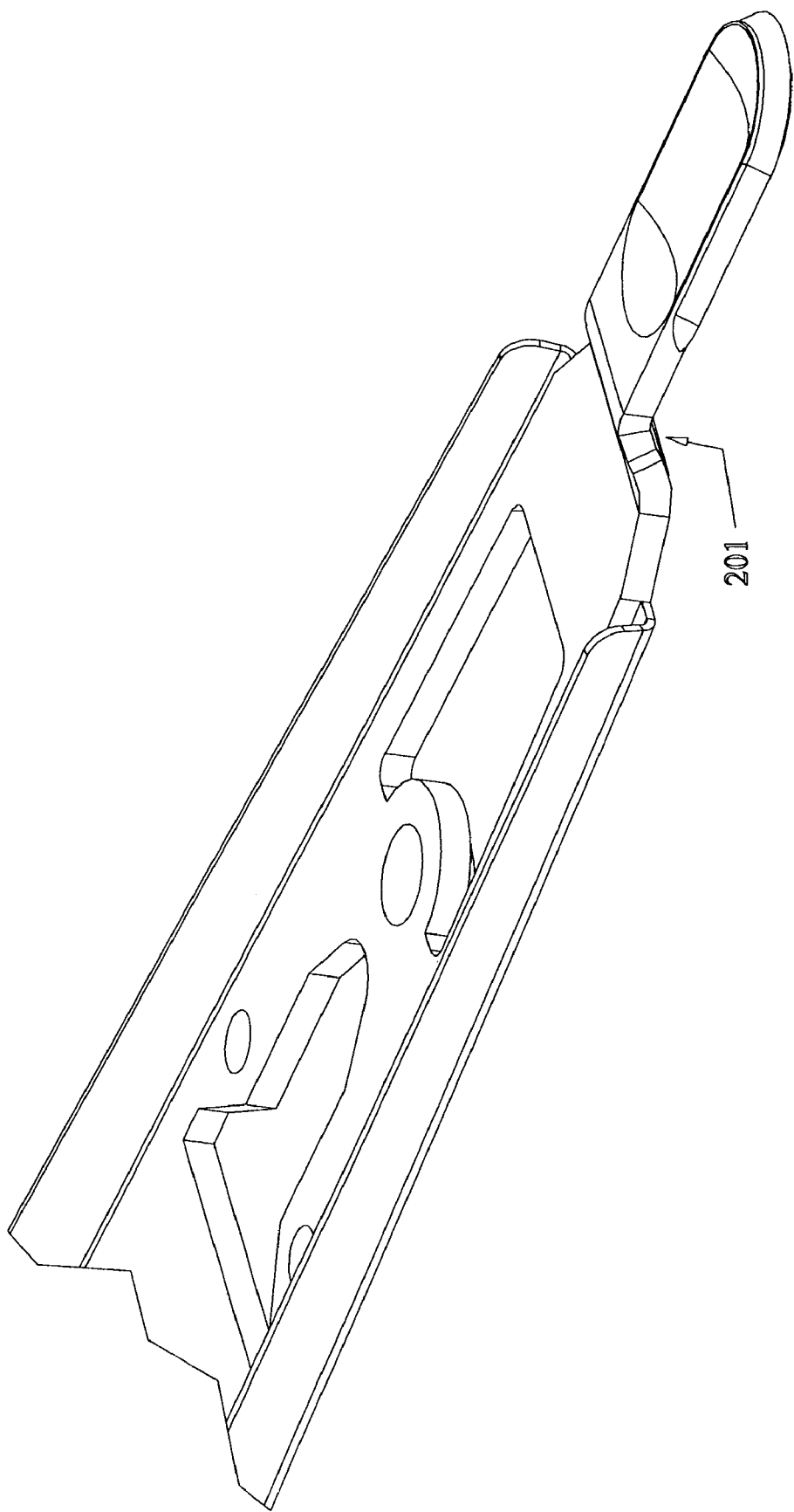
FIG. 2 shows an example of jog forming in a conventional lifter.
Figure 3A:
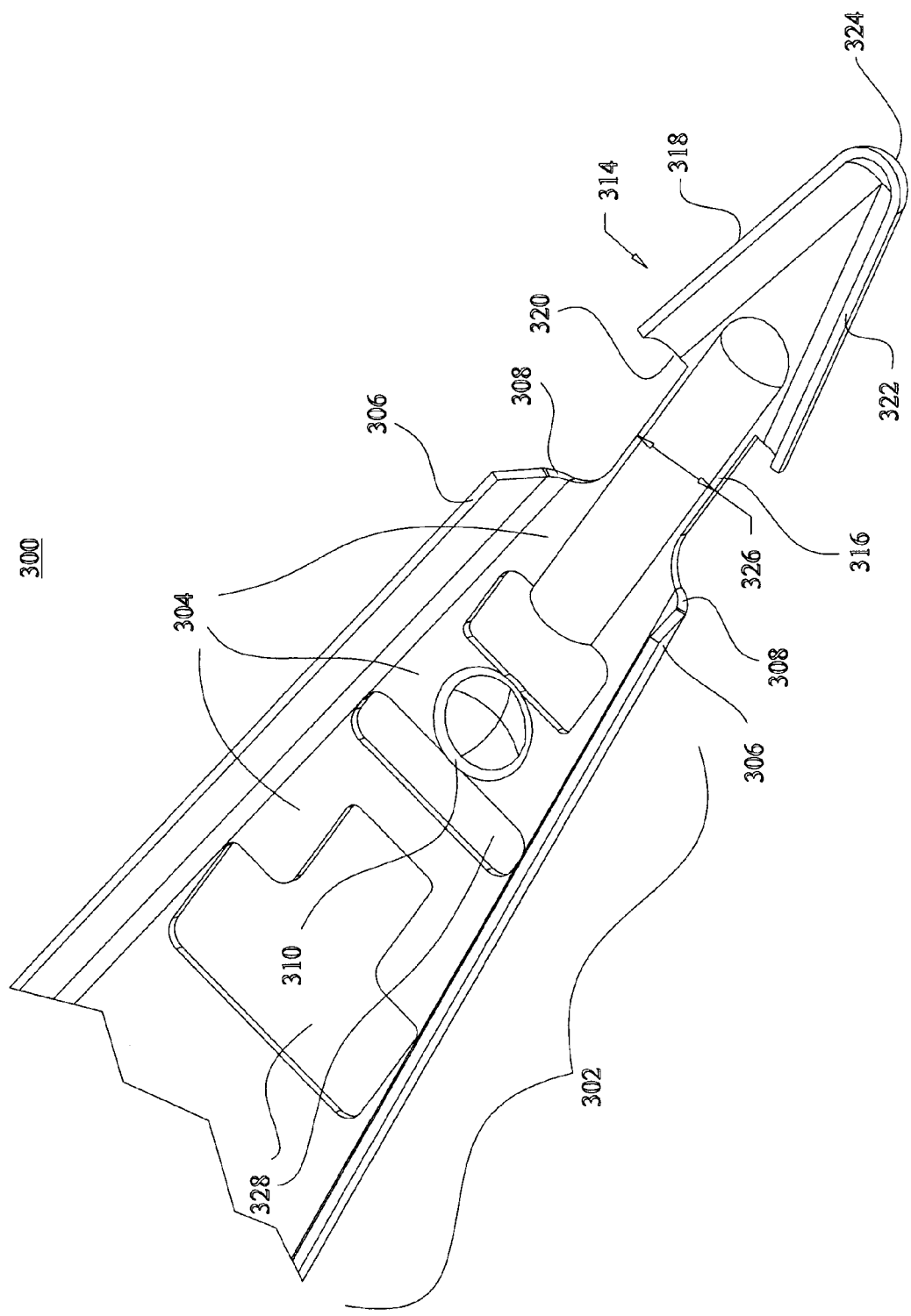
FIG. 3a shows a top isometric view of a first embodiment according to the invention of a high shock load beam employing a lifter comprising a rib and tab.
Figure 3B:
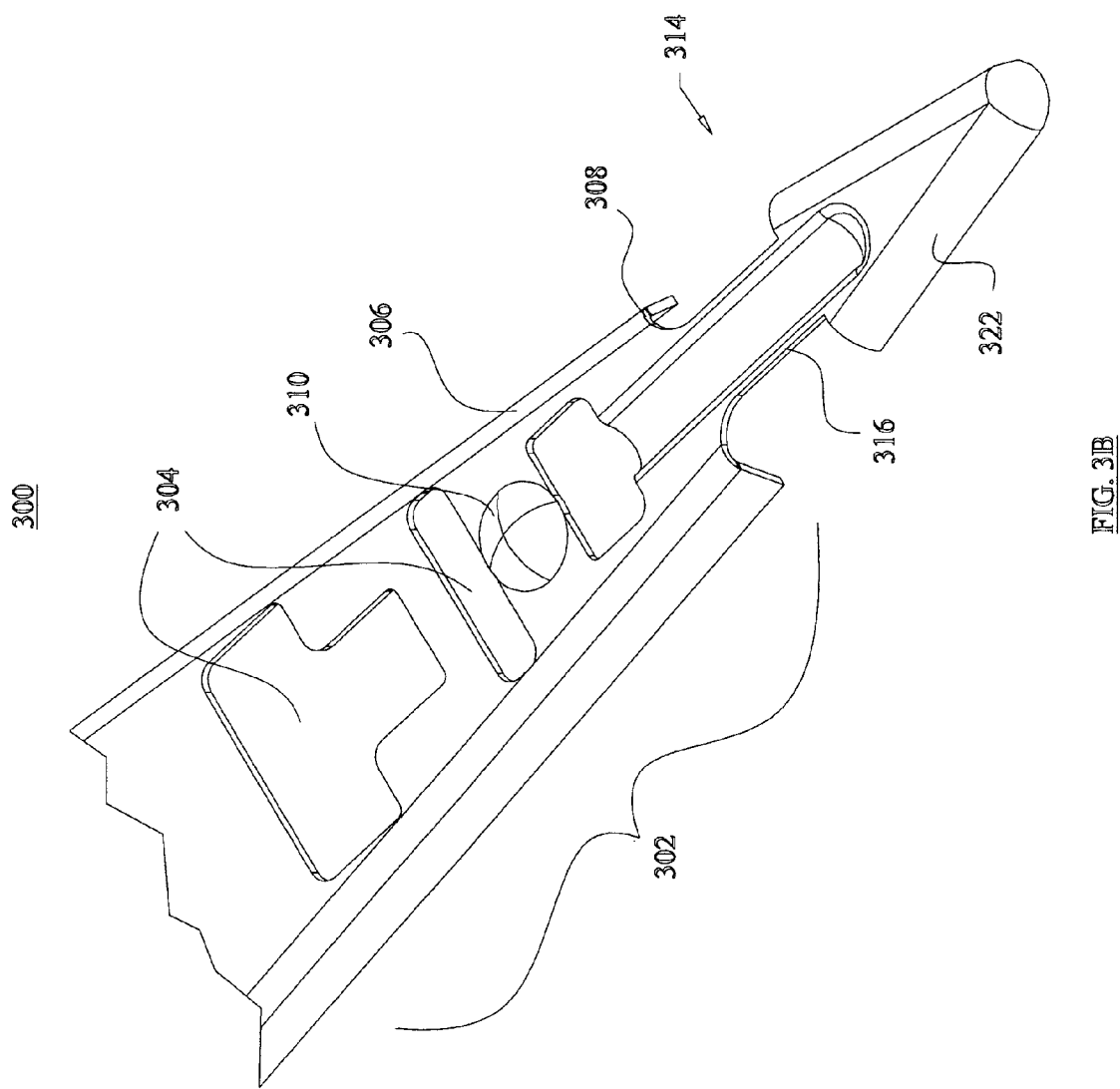
FIG. 3b shows a bottom isometric view of the first embodiment.
Figure 3C:
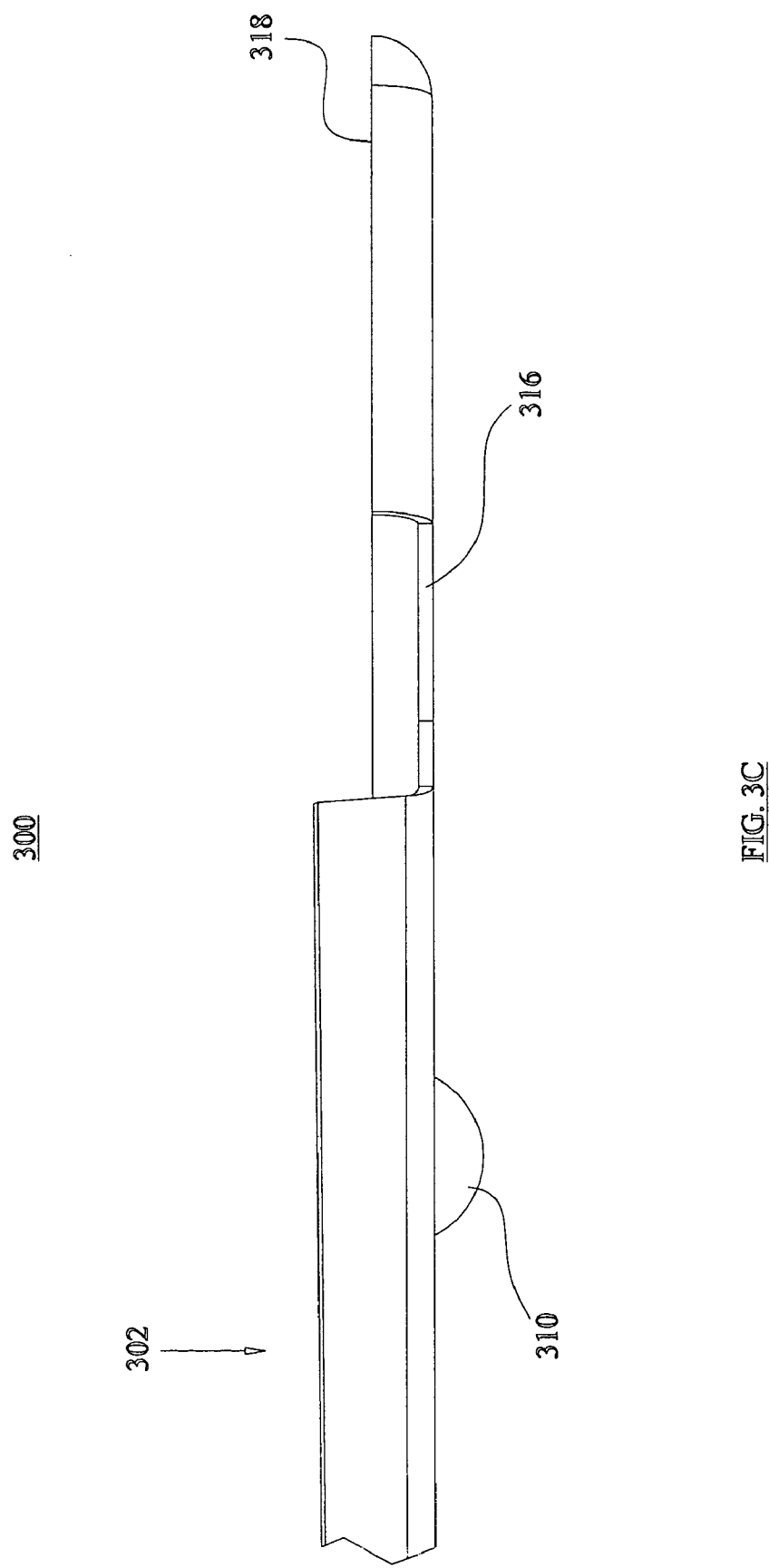
FIG. 3c shows a side view of the first embodiment.

FIGS. 3a, 3b, and 3c illustrate a first embodiment of a load beam 300 designed for high shock performance according to the invention, whereby lifter stiffness and shock performance are improved by extending one or more portions of the load beam in a dimension normal to the load beam plane. Load beam 300 comprises a body portion 302 having one or more substantially planar transverse members 304 extending between rails 306 that border body portion 302 along longitudinal edges 308. A dimple 310 protrudes downward from one of the transverse members 304 to provide a pivot point for a flexure 312 (see FIG. 3D). A lifter 314 comprising a rib 316 having a curved cross section and a tab 318 having a generally triangular shape is located at a distal end of load beam 300. Tab 318 comprises a base 320 and one or more upward curving edges 322 that intersect at or near the point 324 opposite base 320. Rib 316 has a width 326 narrower than that of base 320. Rib 316 extends longitudinally between dimple 310 and tab 318, and connects base 320 to one of the transverse members 304. One or more holes 328 may be formed in the load beam plane, the one or more holes bordered by rails 306 and transverse members 304.

The curved cross section of rib 316 may comprise part of a conic section. For example, the curved section may be circular or comprise a half or partial circle, or it may comprise some portion of an ellipse, parabola, or hyperbola. In the present embodiment, the curved portion is concave up; however, in another embodiment, the curved portion may be concave down. These variations on the cross-sectional form of rib 316 are also possible in the many embodiments of lifters disclosed hereinafter.

In another embodiment, rib 316 is located substantially entirely above the transverse member plane. This means that rib 316 may originate at the plane of a transverse member 304, but does not extend below the load beam plane. Other embodiments of a cross section of rib 316 are possible, such as a triangular cross section, a rectangular cross section, or a cross section resembling an inverted bathtub curve or normal curve, provided that at least some portion of rib 316 extends above the load beam plane. Similarly, shapes other than that of a triangle may comprise tab 318. For example, tab 318 may be generally circular, elliptical, or rectangular. In one implementation, tab 318 is disposed to create an offset from the bottom of dimple 310 to the bottom of tab 318 in a range from about 0.0022 to 0.0042 inches.

Load beam 300, as well as all other load beam embodiments disclosed herein, is preferably formed from a single, planar sheet of metal such as full hard 300 series stainless steel foil. The thickness of the stainless steel may vary according to the application, but is typically less than about 0.0012 inches. Features such as members 304, rails 306, dimple 310 and lifter 314 are preferably formed by punching, bending, peening, drilling, and/or cutting, etc., as the feature may require, by means of one or more automated forming stations. For example, these features may be formed using a conventional progressive die. In one embodiment, the sheet comprises a super thin stainless steel material having a thickness between about 20 μm and about 30 μm. This embodiment achieves a lifter stiffness of about 1005 N/m. Moreover, the narrow configuration of rib 316 and tab 318 allows for a reduction in overall mass.

Figure 3D:
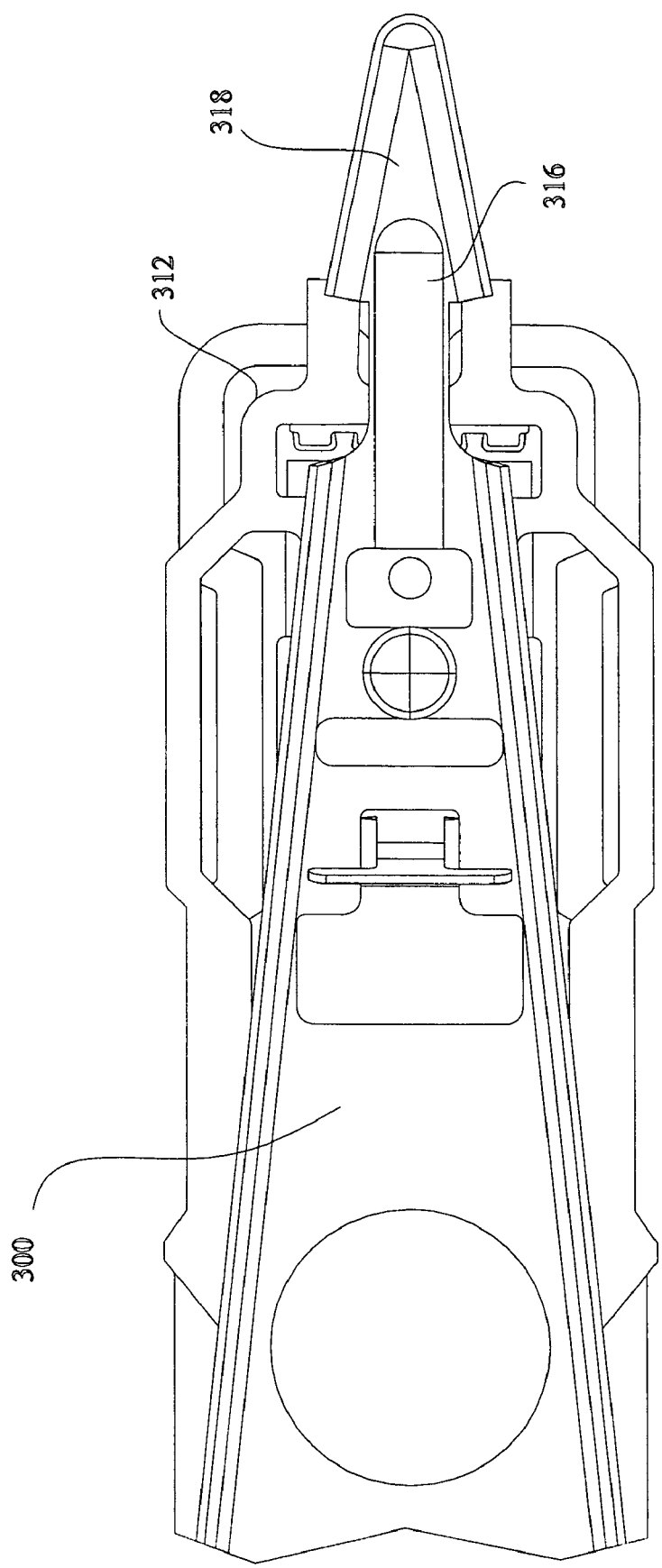
FIG. 3d shows a top, local view of the first embodiment coupled to a flexure.
Figure 3E:
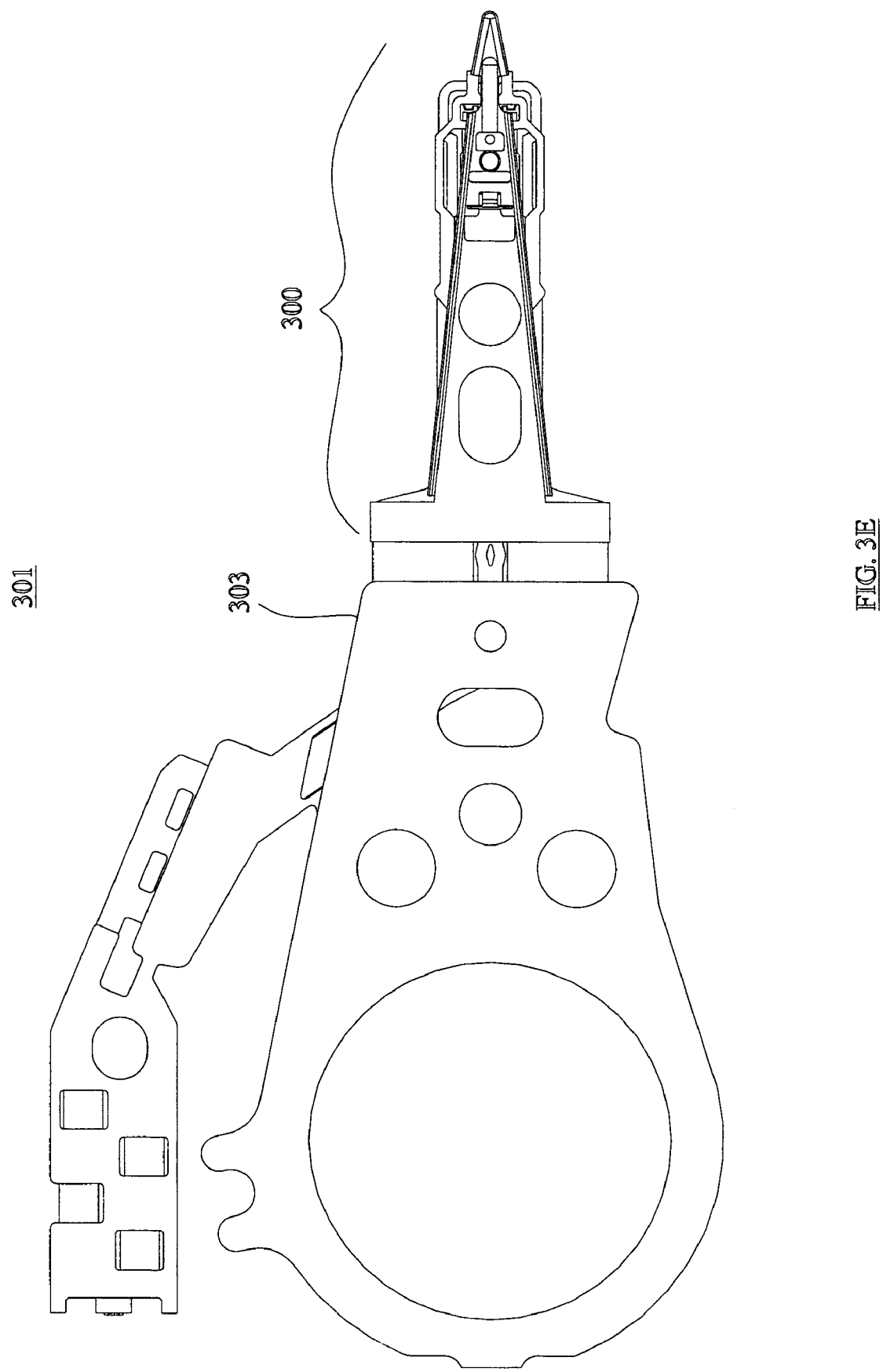
FIG. 3e shows the first embodiment as installed within an entire hard disk drive suspension assembly.

FIG. 3d shows a top, local view of load beam 300 coupled to flexure 312. FIG. 3e shows a top view of load beam 300 as installed within an entire suspension assembly 301. Here, the proximal end of load beam 300 is shown connected to a baseplate 303 of assembly 301.

Figure 4:
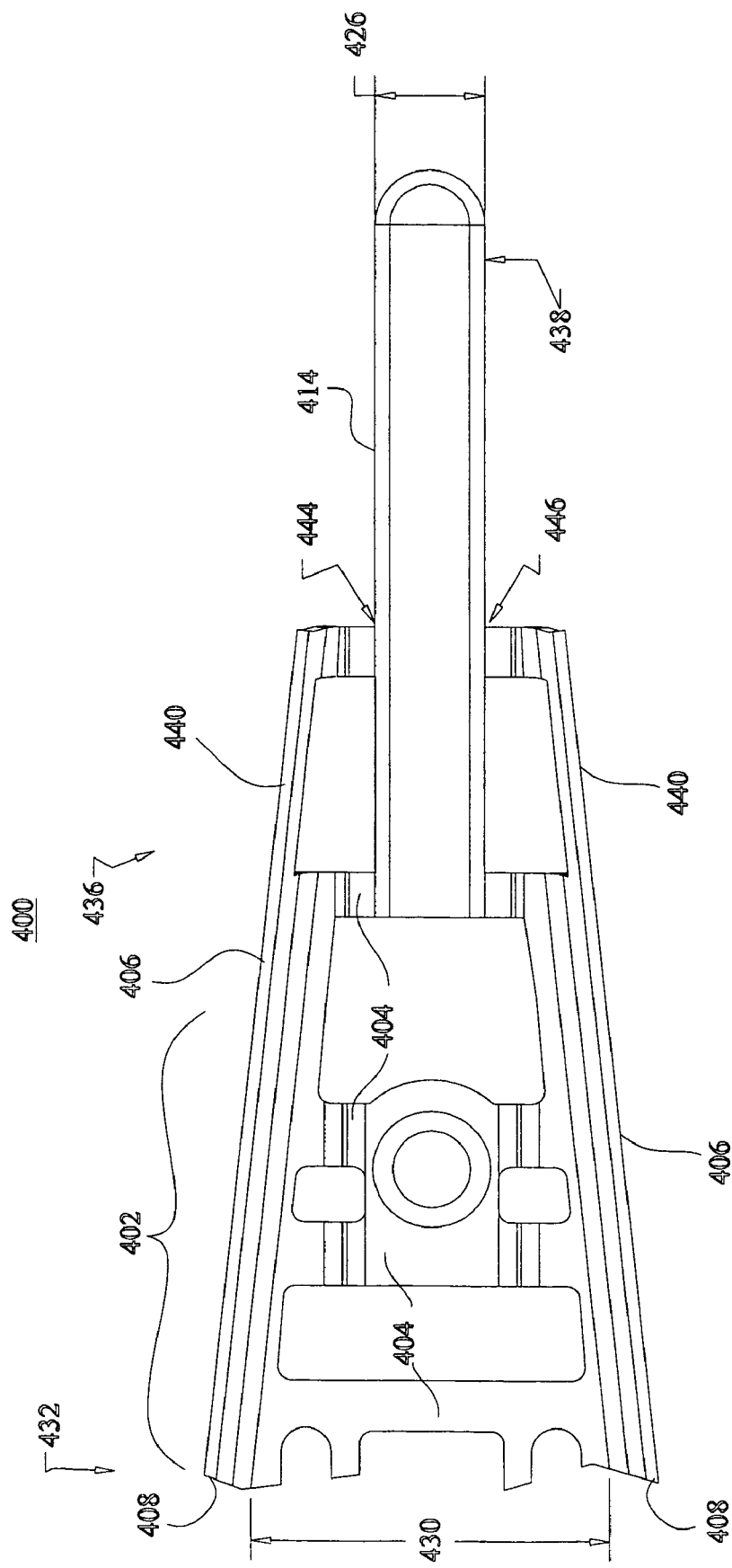
FIG. 4 shows a top view of a second embodiment according to the invention comprising a high shock load beam employing stiffeners.

FIG. 4 illustrates a second embodiment of a load beam according to the invention, whereby load beam portions are extended vertically in a dimension normal to the load beam plane in order to improve lifter stiffness and shock performance ratings. In this embodiment, a load beam 400 comprises a substantially planar body portion 402 having one or more transverse members 404 extending between opposing rails 406. Rails 406 comprise edges 408 that bend at about a 90 degree angle from the one or more transverse members 404. Rails 406 are separated by a first width 430 at a proximal end 432 of body portion 402, and taper to a second width 434 at a distal end 436 of body portion 402. A lifter 414 is displaced between rails 406, and has a width 426 narrower than second width 434. Lifter 414 further comprises one or more upward curving edges 438, and extends in a longitudinal direction from distal end 436, as shown. Stiffeners 440 each extend from one of the rails 406 and connect to lifter 414 at respective intermediate locations 444 and 446 on lifter 414.

By adding stiffeners 440, load beam 400 generally increases the stiffness of lifter 414 by about 50%. In one experimental model, a load beam formed from stainless steel having a uniform thickness in a range of about 20 μm to 30 μm and configured with dual stiffeners exhibited a lifter stiffness on the order of 800 N/m.

Figure 5A:
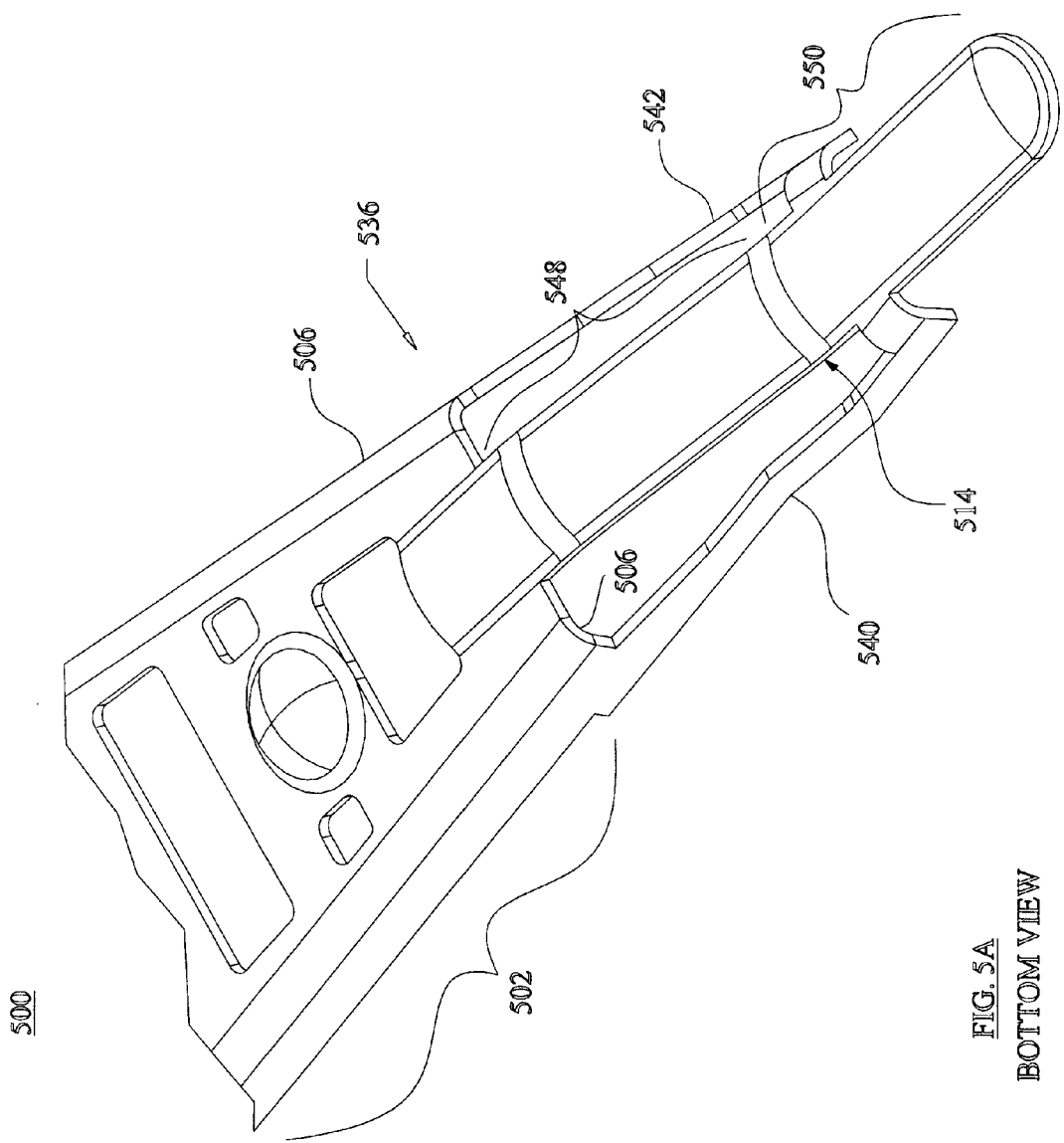
FIG. 5a shows a bottom isometric view of another embodiment according to the invention comprising a high shock load beam employing stiffeners and a lifter having multiple sections.
Figure 5B:
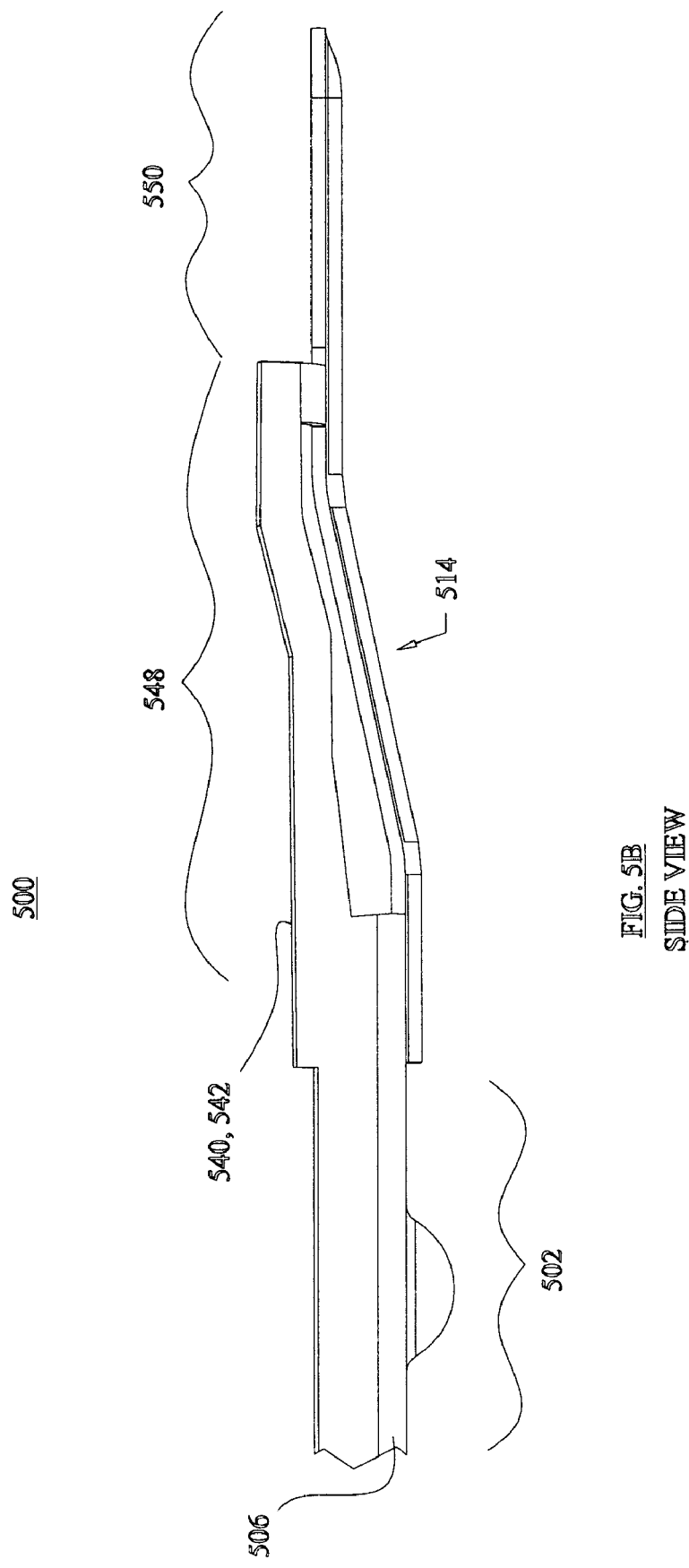

FIG. 5a illustrates another embodiment of a load beam according to the invention, shown in bottom isometric perspective. In this embodiment, a load beam 500 includes a lifter 514, which further comprises a first section 548 and a second section 550. First section 548 is displaced between rails 506 and extends in a longitudinal direction from a distal end 536 of body portion 502 to a higher elevation. Second section 550 extends in the longitudinal, direction from a distal end of first section 548 along the higher elevation, as shown. Stiffeners 540 and 542 each extend from a rail 506 and connect to second section 550 to enhance the stiffness of lifter 514. FIG. 5b shows a side view of this embodiment.

Those skilled in the art will recognize that additional embodiments of a load beam according to the invention include the basic configuration of the load beam of FIG. 5a, made more elaborate by dividing a lifter 514 into a greater plurality of sections. For example, lifter 514 may comprise first, second, and third sections. The first section may be displaced between rails 506 and extend in the longitudinal direction from distal end 536 at an elevation substantially level with body portion 502. The second section may then extend in the longitudinal direction from the distal end of the first section to another elevation (higher or lower). From that point, the third section may extend from the distal end of the second section in the longitudinal direction and remain at a constant elevation, or it, too may extend to a new elevation. In one implementation of this example, one or more stiffeners may connect to the second section. In another implementation, one or more stiffeners may connect directly to the third section. In another example, two or more stiffeners may connect to different sections of the lifter. Many variations are possible.

Figure 6A:
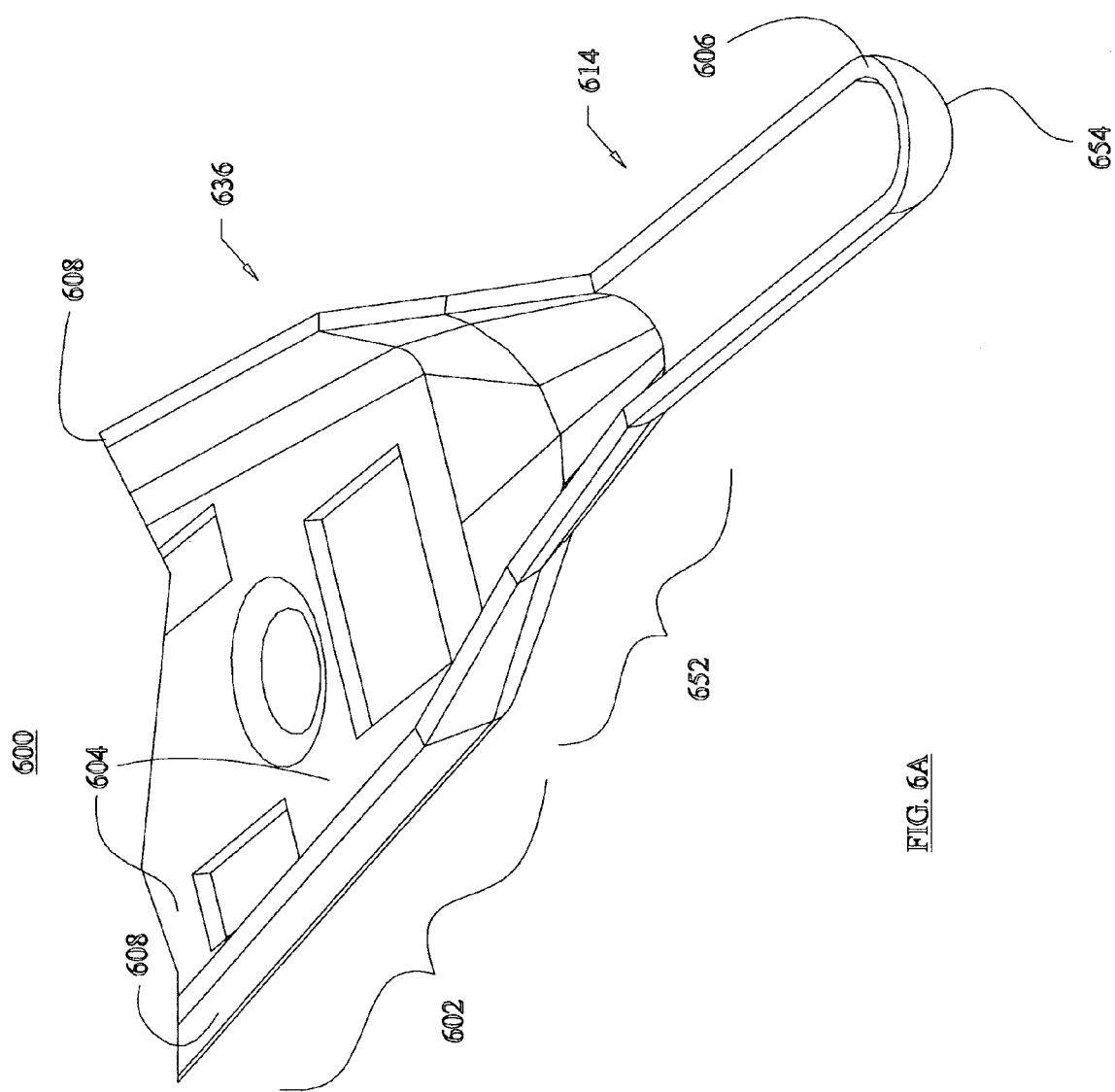
FIG. 6a shows a top isometric view of another embodiment according to the invention comprising a high shock load beam having a transition portion between body and lifter, and a continuous 90 degree rail along its border.
Figure 6B:
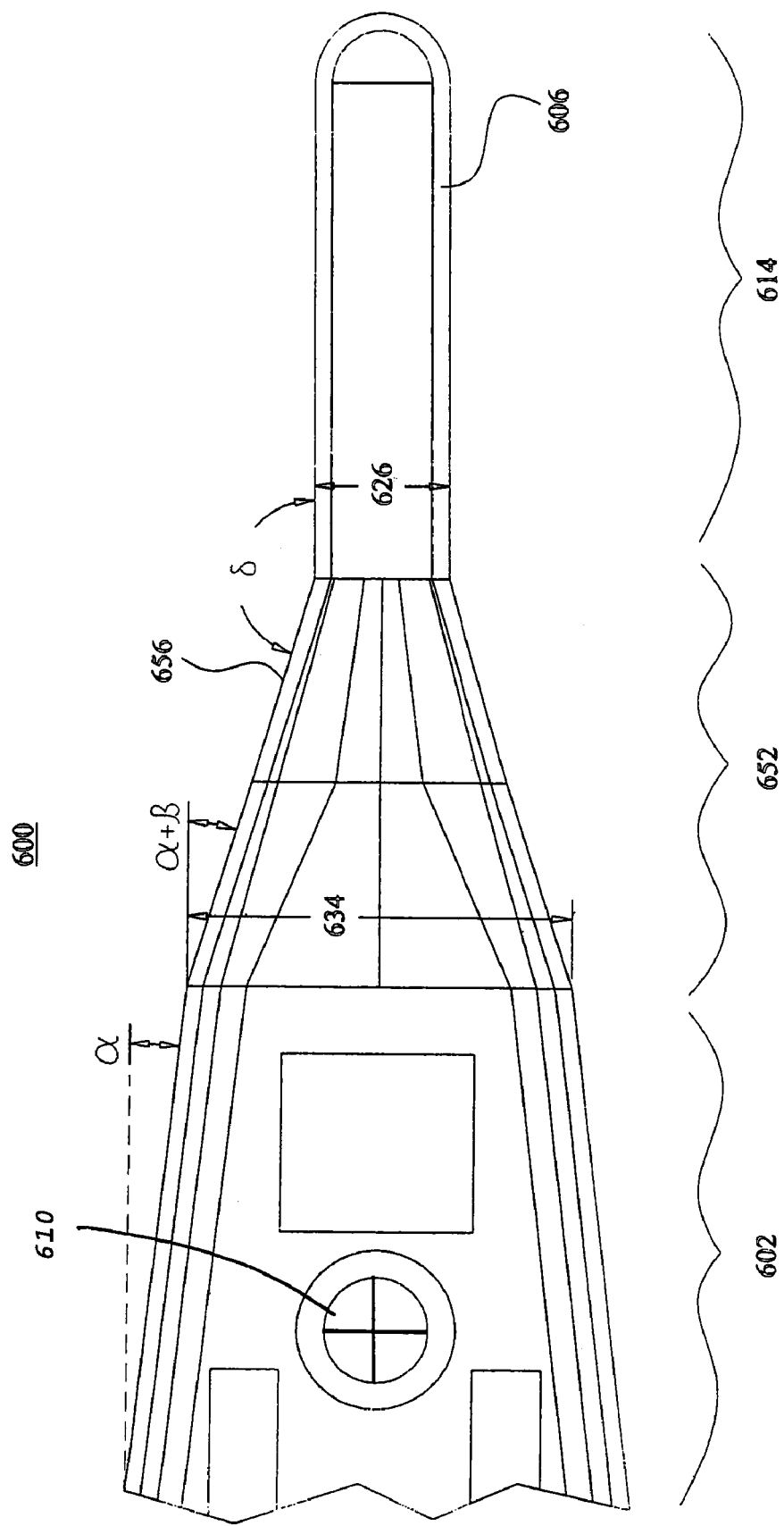

FIGS. 6a and 6b illustrate another embodiment of a load beam having a high-shock suspension lifter according to the invention. In this embodiment, load beam 600 comprises a substantially planar body 602 having one or more transverse members 604 extending between opposing longitudinal edges 608. In one embodiment, a dimple 610 is formed in a transverse member 604 to create an offset between the bottom of dimple 610 and the bottom of lifter 614 in a range of about 3 mils to about 7 mils. Edges 608 are separated at a distal end 636 of body 602 by a first width 634. A transition portion 652 extends from distal end 636 in a longitudinal direction and tapers to form a narrower, second width 626. A lifter 614 extends from second width 626 in the longitudinal direction. Lifter 614 has a width substantially equal to second width 626, and terminates in a rounded end 654. A rail 606 comprises a continuous border around body 602, transition portion 652, and lifter 614. Rail 606 bends at an angle of about 90 degrees from the plane of body 602 and maintains a substantially uniform height with respect to that plane. By advantageously employing the continuous rail along the load beam border as in embodiment 600, lifter stiffness can be greatly enhanced. In one such experimental model, a stiffness of about 1000 N/m was achieved for a load beam having a thickness of about 20 μm.

FIG. 6b shows a top view of a load beam 600 to illustrate the concept of tapering in a transition portion 652. In this particular example, at the location of first width 634, body 602 is already tapering slightly an angle of about 5.5 degrees with respect to a line extending in the longitudinal direction. Beginning at the same location, transition portion 652 tapers from body 602 at an angle of about 11 degrees, and maintains that slope until connecting to lifter 614. At the junction between transition portion 652 and lifter 614, the tapering ceases, and lifter 614 forms an angle of about 16.5 degrees with respect to tapering edge 656, thereby redirecting rail 606 to the longitudinal direction. These angles are given for purposes of illustration only. Other embodiments are possible wherein the tapering angle and redirecting angle may each lie anywhere within a range between about 0 degrees and about 90 degrees, or where lifter 614 forms an angle other than zero with respect to the longitudinal direction.

FIG. 7*a* illustrates another embodiment of a load beam according to the present invention. In this embodiment, a load beam 700 is configured generally as in embodiments previously described, with a planar body 702, transverse members 704, rails 706, and lifter 714. This embodiment enhances lifter stiffness and shock performance by first slanting a portion of body 702 upward, then slanting a portion of lifter 714 downward, as best seen in the side view of FIG. 7*b*. The upward slant begins at a location 758 along a transverse member 704. The downward slant begins at an intermediate location 760 on lifter 714. The bend angles of the upward and downward slants, and the precise locations 758 and 760 may vary, and may be selected to achieve a desired offset between the bottom of lifter 714 and the lowest point on load beam 700. Typically, these bend angles will fall within a range of about 5 to about 15 degrees.

Skilled artisans will recognize that the dual slanting technique disclosed in load beam 700 may be readily applied to any of the foregoing embodiments alone (as in load beam 700), or in combination with other aspects of those embodiments to further enhance lifter stiffness and shock performance. On certain load beam configurations, the dual slanting technique allows formation of a narrower load beam, thereby reducing mass, and can achieve a shock rating up to 725 g/gm and a lifter stiffness on the order of 1000 N/m.

FIG. 7*c* illustrates another implementation according to the invention of a dual slanting technique. In this example, a lifter 714 extending distally from a body portion 702 slants upward beginning at a distal end 736 of body portion 702, at an angle between about 5 and about 15 degrees with respect to a line parallel to the load beam plane. At an intermediate location 760 on lifter 714, lifter 714 begins a downward slant at an angle between about 5 and about 15 degrees with respect to the upward slant. In another example, the downward slant redirects lifter 714 to a position substantially parallel with the load beam plane.

Figure 8:
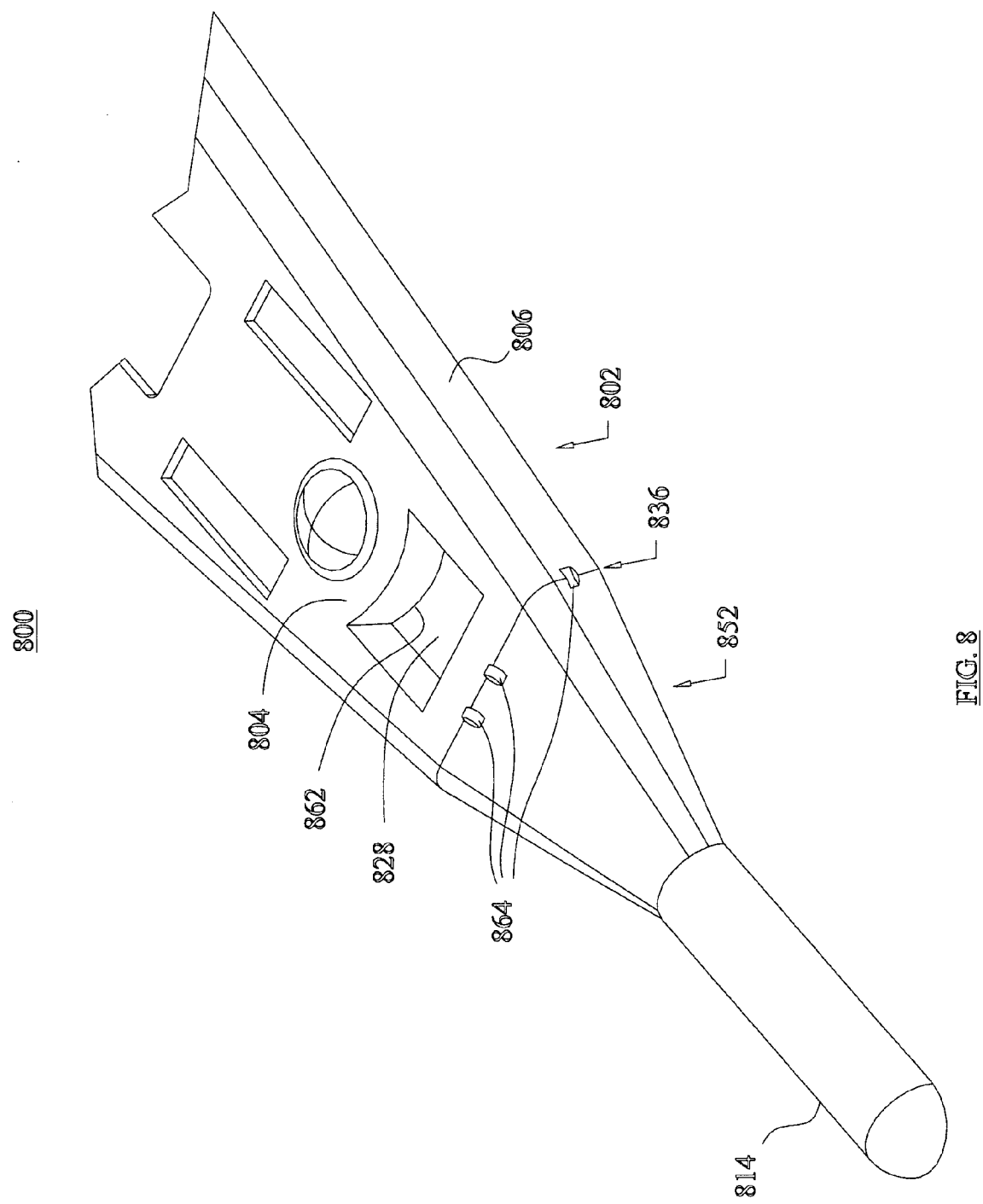
FIG. 8 shows a bottom view of another embodiment according to the invention equipped with additional features to enhance lifter stiffness and shock performance.

FIG. 8 shows a bottom view of a load beam to illustrate additional techniques in accordance with the invention for enhancing lifter stiffness and shock performance. A distal end of a load beam 800 is shown. Load beam 800 comprises a body portion 802, a transverse member 804, a rail 806, a hollow portion 828, a transition portion 852, and a lifter 814. Transverse member 804 comprises a curved edge 862 bordering hollow area 828. One or more protrusions 864 are located on a border 836 between body portion 802 and transition portion 852. Protrusions 864 are preferably centered on border 836, but may also be displaced some distance away from center. Protrusions 864 may also be located on either rail 806, as shown. In one implementation, a protrusion 864 comprises a generally oval shape, having a length of about 0.5 mm, a width of about 0.1 mm, and a depth of about 0.5 mm. Other shapes, such as round or rectangular protrusions, are also possible. These features (curved edge 862 and protrusions 864), singly or in combination, have been proven in experimental models to increase lifter stiffness from about 6% to about 15%. These features may be added to any of the foregoing embodiments to enhance load beam shock performance.

While various embodiments of the invention have been illustrated and described, it will be apparent to those of ordinary skill in the art that many more embodiments and implementations are possible that are within the spirit and scope of this invention. Accordingly, the invention is not to be restricted except in light of the attached claims and their equivalents.

What is claimed is:

1. In a hard disk drive system, a load beam for a high shock suspension, comprising:
   a body portion having one or more substantially planar transverse members extending between longitudinal rails, the longitudinal rails separated at a distal end of the body by a first width;
   a transition portion extending from the distal end in a longitudinal direction and tapering from the first width to a second width;
   a dimple protruding from one of the transverse members; and
   a lifter having left and right sides and a tip, the lifter having a rail extending continuously around said lifter left and right sides and said tip, the lifter extending from the second width in the longitudinal direction, the lifter having a width substantially equal to the second width;
   a continuous rail comprising a continuous edge bordering the body portion, transition portion and lifter, the rail bending about 90 degrees from the body plane and maintaining a substantially uniform height with respect to a plane of the body, the continuous rail including the longitudinal rails and the lifter rail.

2. In a hard disk drive system, a load beam for a high shock suspension, comprising:
   a substantially planar body having one or more transverse members extending between opposing longitudinal edges, the edges separated at a distal end of the body by a first width;
   a transition portion extending from the distal end in a longitudinal direction and tapering from the first width to a second width;
   a lifter extending from the second width in the longitudinal direction, the lifter having a width substantially equal to the second width; and
   a rail comprising a continuous edge bordering the body, transition portion and lifter, the rail bending about 90 degrees from the body plane and maintaining a substantially uniform height with respect to the body plane.

3. The load beam of claim 2 wherein the lifter has a cross-section comprising part of a conic section.

4. The load beam of claim 2 wherein the lifter further comprises a distal end having a rounded form bordered by the rail.

5. The load beam of claim 2 formed from a planar metal having a uniform thickness in a range of about 20 μm to 30 μm.

6. The load beam of claim 2 wherein the transition portion tapers from the body at an initial angle in a range between about 0 degrees and about 90 degrees.

7. The load beam of claim 2 wherein the rail forms an angle between an edge of the transition portion and an edge of the lifter in a range of about 0 degrees to about 90 degrees.

8. The load beam of claim 2 further comprising a dimple formed in one of the transverse members, creating an offset between dimple bottom and lifter bottom in a range of about 3 mils to about 7 mils.

9. The load beam of claim 2 further comprising an upward slant beginning at a location proximal to the lifter, at an angle between about 5 degrees and about 15 degrees with respect to the body plane, and a downward slant beginning at an intermediate location on the lifter, at an angle between about 5 and about 15 degrees with respect to the upward slant.

10. The load beam of claim 2 further comprising an upward slant beginning at an intermediate location on the lifter, at an angle between about 5 degrees and about 15 degrees with respect to the body plane, and a downward slant beginning at a location distal to the upward slant, at an angle between about 5 and about 15 degrees with respect to the upward slant.

11. The load beam of claim 2 further comprising at least one protrusion located on a border between the planar body and the transition portion.

12. The load beam of claim 11 wherein the at least one protrusion is located on the rail.

13. In a hard disk drive system, a load beam for a high shock suspension, comprising:
- a substantially planar body having at least one transverse member extending between opposing longitudinal edges, the edges separated at a distal end of the body by a first width;
- a hollow area in the body bordered by the first width, the edges, and the at least one transverse member;
- a transition portion extending from the distal end in a longitudinal direction and tapering from the first width to a second width;
- a lifter extending from the second width in the longitudinal direction, the lifter having a width substantially equal to the second width; and
- a rail comprising a continuous edge bordering the body, transition portion, and lifter, the rail bending about 90 degrees from the body plane and maintaining a substantially uniform height with respect to the body plane.

14. The load beam of claim 13 further comprising at least one protrusion located on a border between the planar body and the transition portion, and wherein the at least one transverse member comprises a curved border.

15. The load beam of claim 14 wherein the at least one protrusion is located on the rail.

16. The load beam of claim 14 wherein the at least one protrusion has a maximum length of about 0.5 mm and a maximum depth of about 0.5 mm.

* * * * *